(12) United States Patent
Takamizu et al.

(10) Patent No.: US 6,390,562 B1
(45) Date of Patent: May 21, 2002

(54) LOCKING CLIP

(75) Inventors: Nobuaki Takamizu; Kojiro Yamazaki, both of Urawa (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 09/671,596

(22) Filed: Sep. 28, 2000

(30) Foreign Application Priority Data

Sep. 30, 1999 (JP) .............................................. 11-279644

(51) Int. Cl.[7] .......................... A47C 15/00; A47C 31/00
(52) U.S. Cl. ................. 297/483; 297/250.1; 297/463.2; 297/463.1; 24/71 SB; 24/71.1
(58) Field of Search ........................... 297/250.1, 463.1, 297/463.2, 483; 24/666, 71 SB, 71 ST, 71.1

(56) References Cited

U.S. PATENT DOCUMENTS

| | | | | |
|---|---|---|---|---|
| 4,893,835 A | * | 1/1990 | Linden ........................ | 280/808 |
| 5,154,446 A | * | 10/1992 | Blake ......................... | 280/808 |
| 5,286,090 A | * | 2/1994 | Templin et al. ............. | 297/473 |
| 5,791,688 A | * | 8/1998 | Koledin ...................... | 280/808 |
| 5,845,372 A | * | 12/1998 | Smith et al. ................. | 24/168 |
| 5,979,982 A | * | 11/1999 | Nakagawa ............... | 297/250.1 |

* cited by examiner

Primary Examiner—Peter M. Cuomo
Assistant Examiner—Joseph Edell
(74) Attorney, Agent, or Firm—Wenderoth, Lind & Ponack, L.L.P.

(57) ABSTRACT

A locking clip is attached to a seat belt fastening a child car seat to a seat of a vehicle to facilitate tightening the seat belt and to ensure that the seat belt may not loosen. The locking clip is attached to a portion of the seat belt where a waist belt section and a shoulder belt section of the seat belt diverge from each other. The locking clip has a belt clamping mechanism clamping the waist belt section and the shoulder belt section together, and a ratchet mechanism for permitting the shoulder belt section to be pulled only in one direction to tighten the seat belt and to prevent the seat belt from loosening.

4 Claims, 10 Drawing Sheets

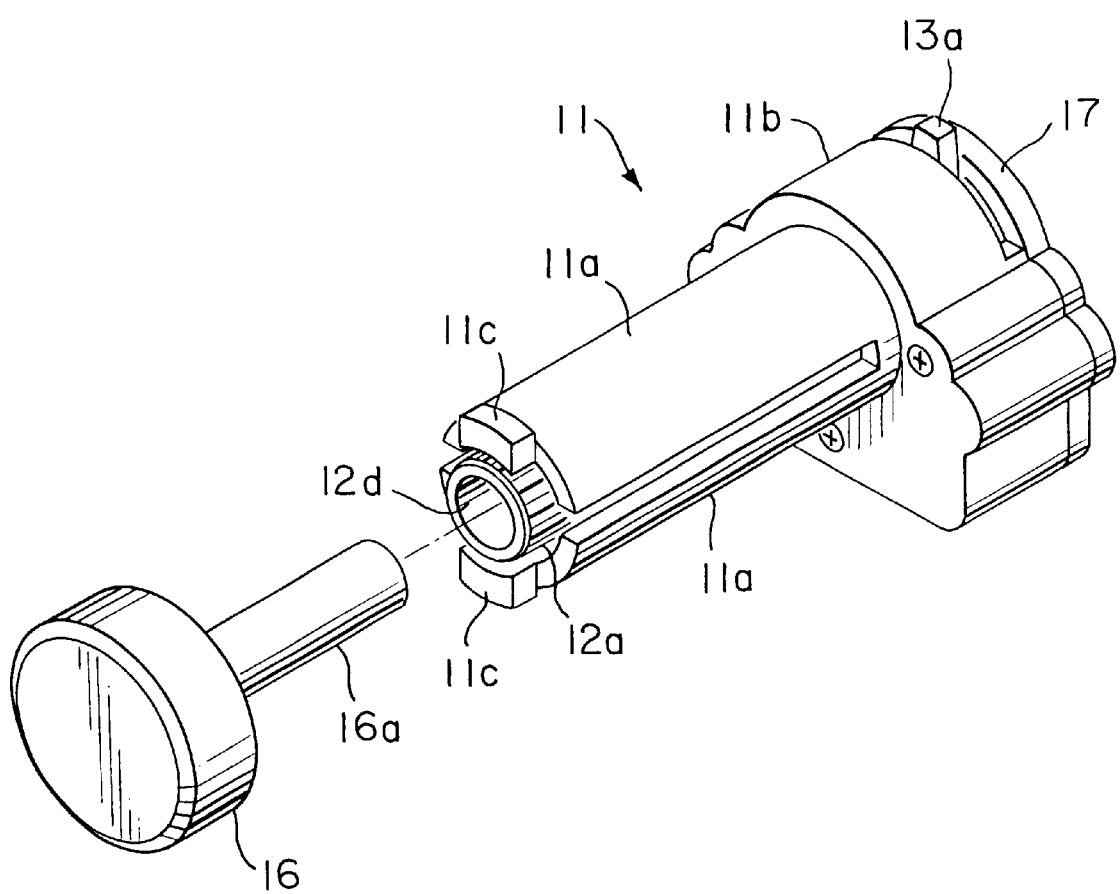
F I G. 2

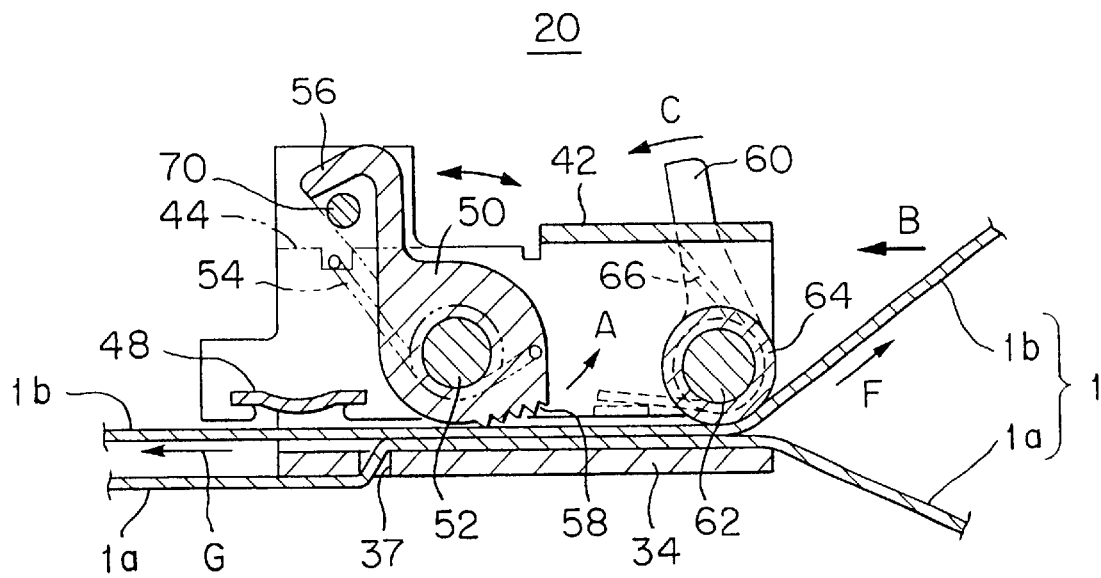
F I G. 7A
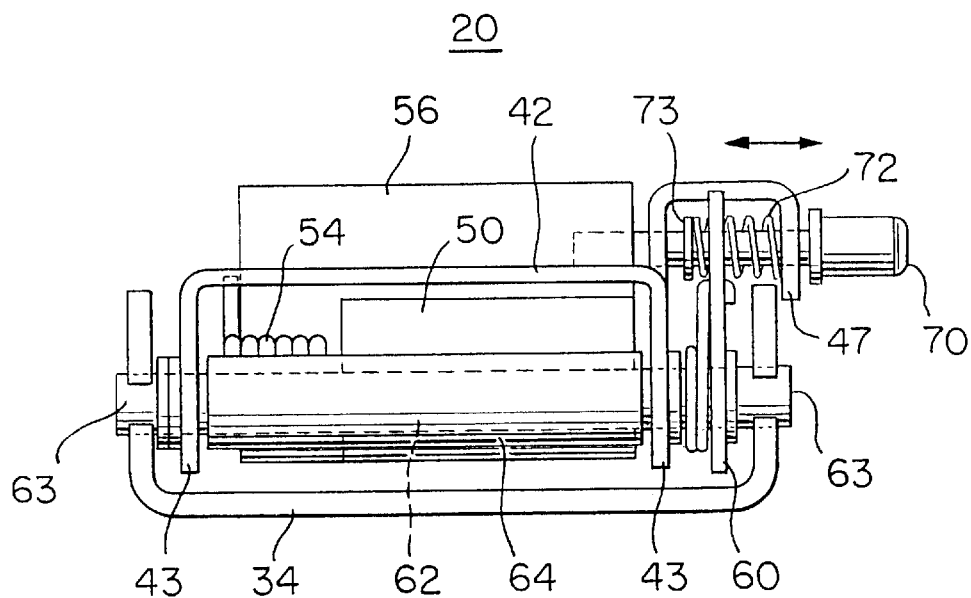
F I G. 7B

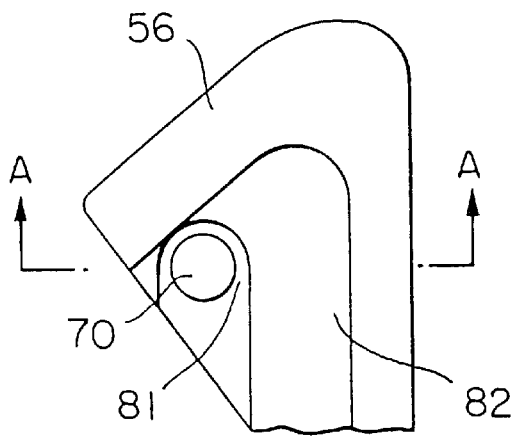
FIG. 8A(i)
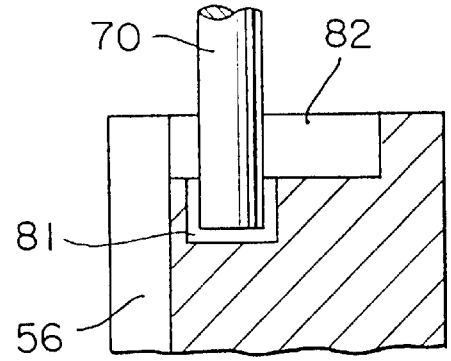
FIG. 8A(ii)
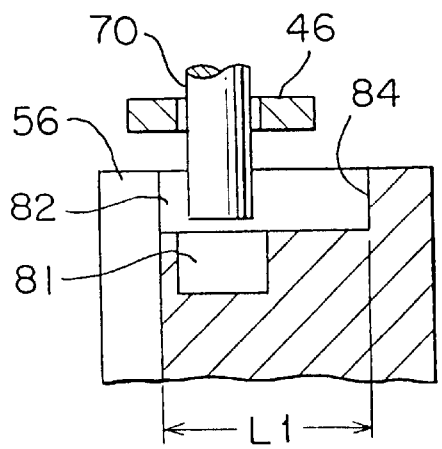
FIG. 8B(i)
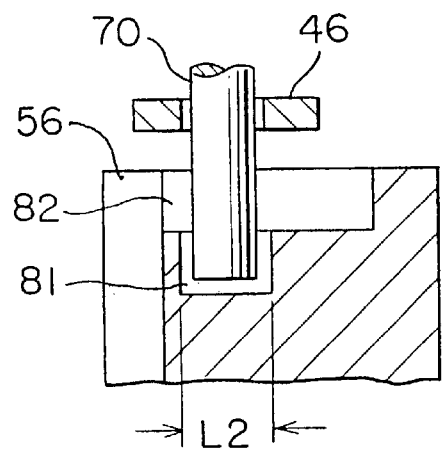
FIG. 8B(ii)

LOCKING CLIP

FIELD OF THE INVENTION

The present invention relates to a locking clip and, more specifically, to a locking clip to be connected to a seat belt that fastens a child car seat to a seat of a vehicle to lock the seat belt.

DESCRIPTION OF THE RELATED ART

FIG. 9 is a perspective view of a child car seat 4 placed on a seat 2 of a vehicle. Generally, the child car seat 4 is fastened to the seat 2 of the vehicle by a seat belt 1 of the vehicle, as shown in FIG. 9. In FIG. 9, the seat belt 1 includes a waist belt section 1a and a shoulder belt section 1b. One end of the waist belt section 1a is secured to a position under a seat cushion 3 of the seat 2, and one end of the shoulder belt section 1b is secured to a position above a seat back of the seat 2 through a retractor, not shown. A tongue 1c is connected to the other ends of the waist belt section 1a and the shoulder belt section 1b. Referring to FIG. 9, the child car seat 4 is placed on the seat 2, the tongue 1c connected to the seat belt 1 is passed through a belt slot 6 formed in one side wall of a base 5 included in the child car seat 4 and another belt slot formed in the other side wall of the base 5 and is engaged with a buckle 7 (FIGS. 10A and 10B) disposed beside the seat cushion 3 of the seat 2. The child car seat 4 may be set on the seat 2 so that a child seated on the child car seat 4 faces either forward or rearward.

FIGS. 10A and 10B are partial sectional front elevations of the seat 2 of the vehicle and the child car seat 4 mounted on the seat 2 and fastened to the seat 2 with the seat belt 1. In FIG. 10A, the seat belt 1 is passed across the base 5 of the child car seat 2 and simply holds the child car seat 2 in place. In FIG. 10B, the seat belt 1 passed across the base 5 of the child car seat 2 is tightened by a locking clip 9. Although the tongue 1c is engaged with the buckle 7, a portion 1b' of the shoulder belt section 1b of the seat belt 1 extending near the belt slot 6 is separated from the waist belt section 1a of the seat belt 1 and hence, the child car seat 4 cannot be securely held on the seat 2.

As shown in FIG. 10B, respective portions of the waist belt section 1a and the shoulder belt section 1b of the seat belt 1 fastening the child car seat 4 to the seat 2 extending near the belt slot 6 are superposed and are bound together with the locking clip 9 to fasten the child car seat 4 firmly to the seat 2 by the seat belt 1.

The locking clip 9 is, for example, a comblike plate provided with bars. The superposed portions of the waist belt section 1a and the shoulder belt section 1b are passed alternately above and below the alternate bars to hold the superposed portions of the waist belt section 1a and the shoulder belt section 1b frictionally together.

If the child car seat 4 is still loosely fastened to the seat 2, even with the superposed portions of the waist belt section 1a and the shoulder belt section 1b bound together with the comblike locking clip 9, the shoulder belt section 1b must be further pulled toward the retractor for tightening. When pulling the shoulder belt section 1b toward the retractor for tightening, a portion of the seat belt 1 extending between the bars of the comblike locking clip 9 must be released from the comblike locking clip 9, slack in the seat belt 1 must be pulled into the retractor, and the locking clip 9 must again be put on the seat belt 1, which requires troublesome work.

SUMMARY OF THE INVENTION

Accordingly, it is an object of the present invention to provide a locking clip that simplifies an operation of increasing the tightness of a seat belt fastening a child car seat to a seat of a vehicle to hold the child car seat securely on the seat of the vehicle.

According to the present invention, there is provided a locking clip to be attached to a portion of a seat belt having a waist belt section securely fastening a child car seat to a seat of a vehicle and a shoulder belt section, at which the waist belt section and the shoulder belt section diverge from each other. The locking clip includes a belt clamping mechanism for clamping together the waist belt section and the shoulder belt section, and a ratchet mechanism for permitting the shoulder belt section clamped by the belt clamping mechanism to be pulled only in one direction.

Thus, the seat belt fastening the child car seat to the seat of the vehicle can be further tightened simply by pulling the shoulder belt section of the seat belt toward a belt retractor to fasten the child car seat more firmly and securely to the seat of the vehicle.

Preferably, the belt clamping mechanism includes a casing, and a rotating member disposed in the casing so as to clamp the waist belt section and the shoulder belt section between the casing and the rotating member. Also, it is preferred that the ratchet mechanism includes a ratchet wheel fixedly connected to the rotating member, and a holding link biased toward the ratchet wheel so as to be engaged with the ratchet wheel to permit the ratchet wheel to rotate only in one direction. Thus, the ratchet mechanism is simple in construction, is easy to operate and operates with reliability.

Preferably, the rotating member has a circumference with an antislip shape capable of ensuring a firm grip. It is preferred that the antislip shape has a plurality of circumferentially arranged, elongate, axial ridges. Also, it is preferred that the antislip shape has a plurality of fine knobs.

Thus, the antislip shape of the circumference of the rotating member ensures a firm grip of the seat belt by the rotating member and ensures the effect of the ratchet mechanism.

Preferably, the ratchet mechanism includes a ratchet wheel fixedly connected to the rotating member, and a pair of holding links biased toward the ratchet wheel so as to be engaged with the ratchet wheel to permit the ratchet wheel to rotate only in one direction. One of the hold links permits the ratchet wheel to rotate in a direction and the other hold link permits the ratchet wheel to rotate in a direction opposite the former. The ratchet mechanism also includes a selector lever capable of being turned from a neutral position to a first position to disengage one of the holding links from the ratchet wheel and also capable of being turned from the neutral position to a second position to disengage the other holding link from the ratchet wheel.

Since the rotating direction of the ratchet wheel can be selectively determined, the child car seat can be fastened to either the right or the left seat of the vehicle.

According to the present invention, the ratchet mechanism may include a base, and a pressing member extended parallel to the base so as to clamp the waist belt section and the shoulder belt section between the base and the pressing member. Preferably, the ratchet mechanism includes a toothed cam shaft supported for turning on the pressing member and biased toward the base so as to engage teeth of the toothed cam shaft with the shoulder belt section clamped in between the base and the pressing member to permit the shoulder belt section to move only in one direction.

Preferably, the ratchet mechanism further includes a locking member for restraining the toothed cam shaft from turning. It is preferred that the toothed cam shaft is provided with two grooves differing from each other in width, the toothed cam shaft being able to turn when the locking member is inserted in one of the grooves, and the toothed cam shaft being unable to turn when the locking member is inserted in the other groove. Thus, the seat belt can be surely locked after being pulled for tightening.

Preferably, the ratchet mechanism is provided with a guide roller spaced a predetermined distance in the direction of travel of the seat belt from the toothed cam shaft to guide at least the shoulder belt section in its moving direction.

Since the shoulder belt section can be pulled in parallel to the base, the toothed cam shaft can be positively engaged with and disengaged from the shoulder belt section, and the tightness of the seat belt can be easily increased.

BRIEF DESCRIPTION OF THE DRAWINGS

The above and other objects, features and advantages of the present invention will become more apparent from the following description taken in connection with the accompanying drawings, in which:

FIG. 2 is a perspective view of the locking clip of FIG. 1 as assembled and viewed from the opposite side of FIG. 1;

FIGS. 7A and 7B are an enlarged cross-sectional view and an enlarged end view, respectively, of the locking clip of FIG. 5;

FIGS. 8A(i) and (ii) are schematic views showing a positional relation between a toothed cam shaft and a locking pin;

FIGS. 8B(i) and (ii) are schematic sectional views to assist in explaining two positions of the locking pin relative to the toothed cam shaft;

DESCRIPTION OF THE PREFERRED EMBODIMENTS

Figure 1:
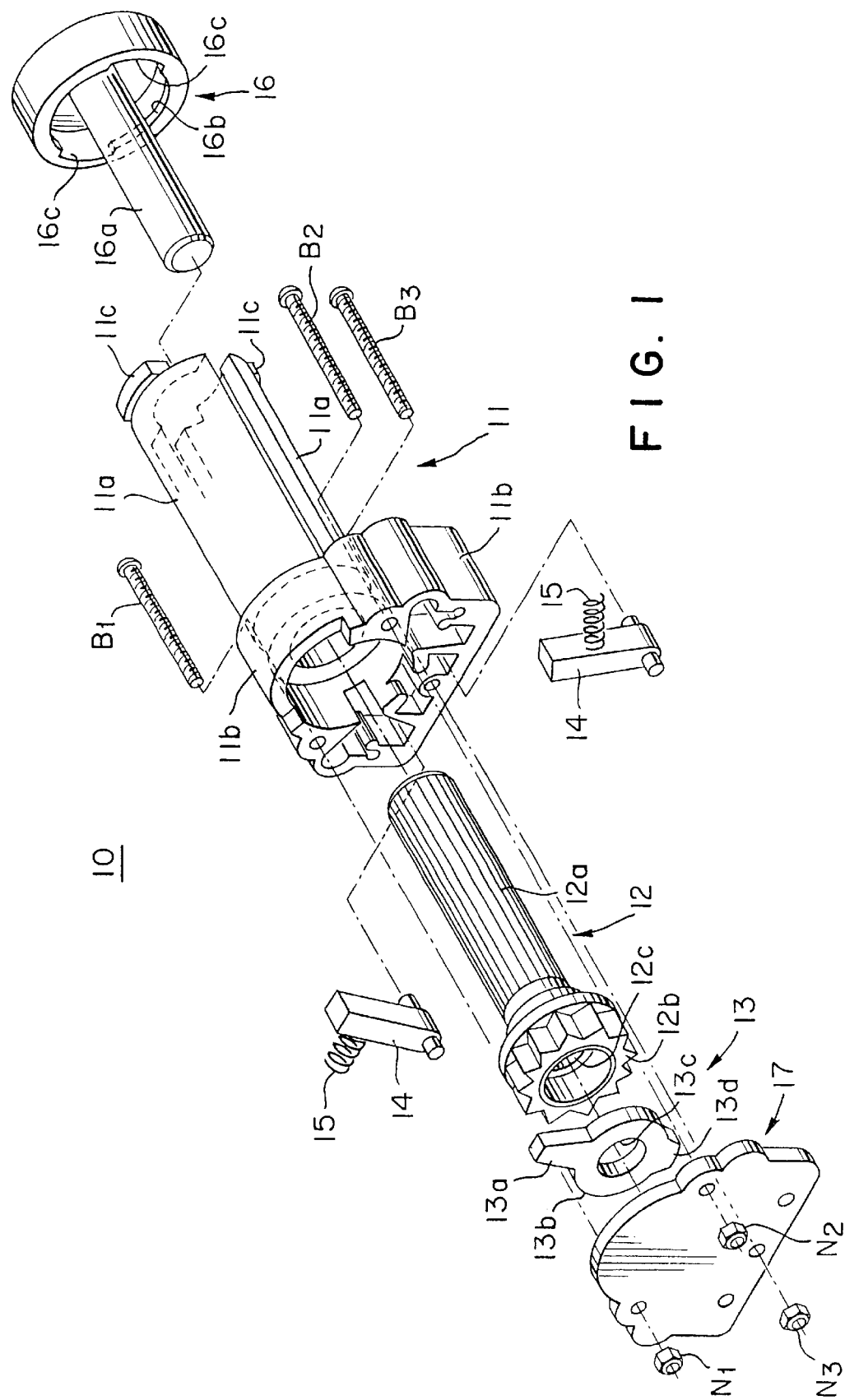
FIG. 1 is an exploded perspective view of a locking clip in a first embodiment of the resent invention.

Referring to FIG. 1 which shows a locking clip 10 in a first embodiment of the present invention, the locking clip 10 has a casing 11, a cap 16 attached to one end of the casing 11, a cover 17 fastened to the other end of the casing 11 with bolts $B_1$ to $B_3$ and nuts $N_1$ to $N_3$. A roller assembly 12 formed by uniting together a clamping roller 12a (rotating member) and a ratchet wheel 12b, a selector lever 13, first and second pawls 14 (holding links), first and second compression coil springs 15 and a retaining spring 18 (FIG. 4B) are contained in the casing 11.

The casing 11 and the clamping roller 12a constitute a belt clamping mechanism. The ratchet wheel 12b, the selector lever 13, the pawls 14 and the compression springs 15 constitute a ratchet mechanism.

The casing 11 has upper and lower semicylindrical parts 11a having a substantially semicylindrical shape and extending opposite to each other with a space of a width $t_1$ (FIG. 3) twice the thickness of a seat belt 1 therebetween, and a base part 11b defining a space for containing parts. The semicylindrical parts 11a extend from the base part 11b in a cantilever fashion. Flanges 11c are formed on the free ends of the semicylindrical parts 11a, respectively. The flanges 11c are inserted through recesses 16c formed in the cap 16 into the cap 16. The clamping roller 12a of the roller assembly 12 is extended in a cylindrical space defined by the two semicylindrical parts 11a. When the clamping roller 12a is inserted in the cylindrical space defined by the semicylindrical parts 11a, a substantially annular space of a thickness approximately equal to the thickness of the seat belt 1 is formed between each semicylindrical part 11a and the clamping roller 12a.

The space defined by the base part 11b of the casing 11 has a cylindrical section in which the ratchet wheel 12b of the roller assembly 12 is placed, and two parallelepipedic sections having the shape substantially resembling a rectangular solid in which the first and the second pawls 14 and the first and the second compression coil springs 15 are placed. The parallelepipedic sections open into the cylindrical section.

Combinations of the pawls 14 and the compression coil springs 15 are placed in the two parallelepipedic sections, respectively. The pawls 14 are biased toward the cylindrical space by the compression coil springs 15. Each pawl 14 has pivots, respectively, projecting from the opposite sides of a lower end portion thereof. One of the pivots is fitted in a hole, not shown, formed in the inner surface of the cover 17 and the other pivot is fitted in a hole, not shown, formed in the base part 11b to support the pawl 14 for turning on the pivots so that an upper end portion of the pawl 14 can be advanced into and retracted from the cylindrical space of the casing 11b.

The roller assembly 12 is formed by uniting together the clamping roller 12a having a knurled circumference capable of exerting frictional resistance against the movement of the seat belt 1, and the ratchet wheel 12b having teeth on its circumference. The knurled circumference may have any suitable shape capable of exerting high frictional resistance against the movement of the seat belt 1, such as a shape having longitudinal ridges formed by knurling or a shape having fine knobs formed by embossing. The clamping roller 12a is provided in one end portion thereof with an axial cylindrical bore 12d as shown in FIG. 2. A shaft 16a coaxially projecting from the inner surface of the cap 16 is fitted in the cylindrical bore 12d of the clamping roller 12a. The ratchet wheel 12b has a cylindrical center hole 12c. An annular ridge 13b formed on one surface of the selector lever 13 is fitted in the center hole 12c of the ratchet wheel 12b.

The clamping roller 12a of the roller assembly 12 is inserted in the casing 11 through the cylindrical space of the base part 11b, so that the clamping roller 12a is extended in the cylindrical space defined by the semicylindrical parts 11a. The ratchet wheel 12b is set in the cylindrical space of the base part 11b.

The selector lever 13 has a body having the shape of a circular, thin plate, a selector lug 13a projecting radially outward from a portion of the body, an operating part 13d projecting radially outward from a portion of the body diametrically opposite to the portion from which the selector lug 13a projects, and the annular ridge 13b. The selector lever 13 is provided with a center hole 13c. The selector lever 13 is put on the ratchet wheel 12b with the annular ridge 13b thereof fitted in the center bore 12c of the ratchet wheel 12b so that the selector lug 13a extends upward. The pawls 14 are placed in the parallelepipedic spaces, being biased toward the cylindrical space by the compression coil springs 15, so as to be engaged with the teeth of the ratchet wheel 12b, respectively. The cover 17 is closely fastened to the base part 11b with the bolts $B_1$ to $B_3$ and the nuts $N_1$, to $N_3$. More specifically, the bolts $B_1$, $B_2$ and $B_3$ are inserted in through holes formed in the base part 11b of the casing 11 and through holes formed in the cover 17, and the nuts $N_1$, $N_2$ and $N_3$ are screwed on the bolts $B_1$, $B_2$ and $B_3$ to fasten the cover 17 to the casing 11.

When the cover 17 is thus closely fastened to the base part 11b, a gap is formed between the cover 17 and the base part 11b to enable the selector lug 13a to project from the base part 11b and to be turned.

FIG. 2 is a perspective view of the locking clip 10 as viewed from the side of the cap 16 in FIG. 1. As shown in FIG. 2, the clamping roller 12a is extended in the cylindrical space defined by the semicylindrical parts 11a of the casing 11 and a substantially annular space of a thickness corresponding to the thickness of the seat belt 1 is formed between the clamping roller 12a and the semicylindrical parts 11a.

Figure 3:
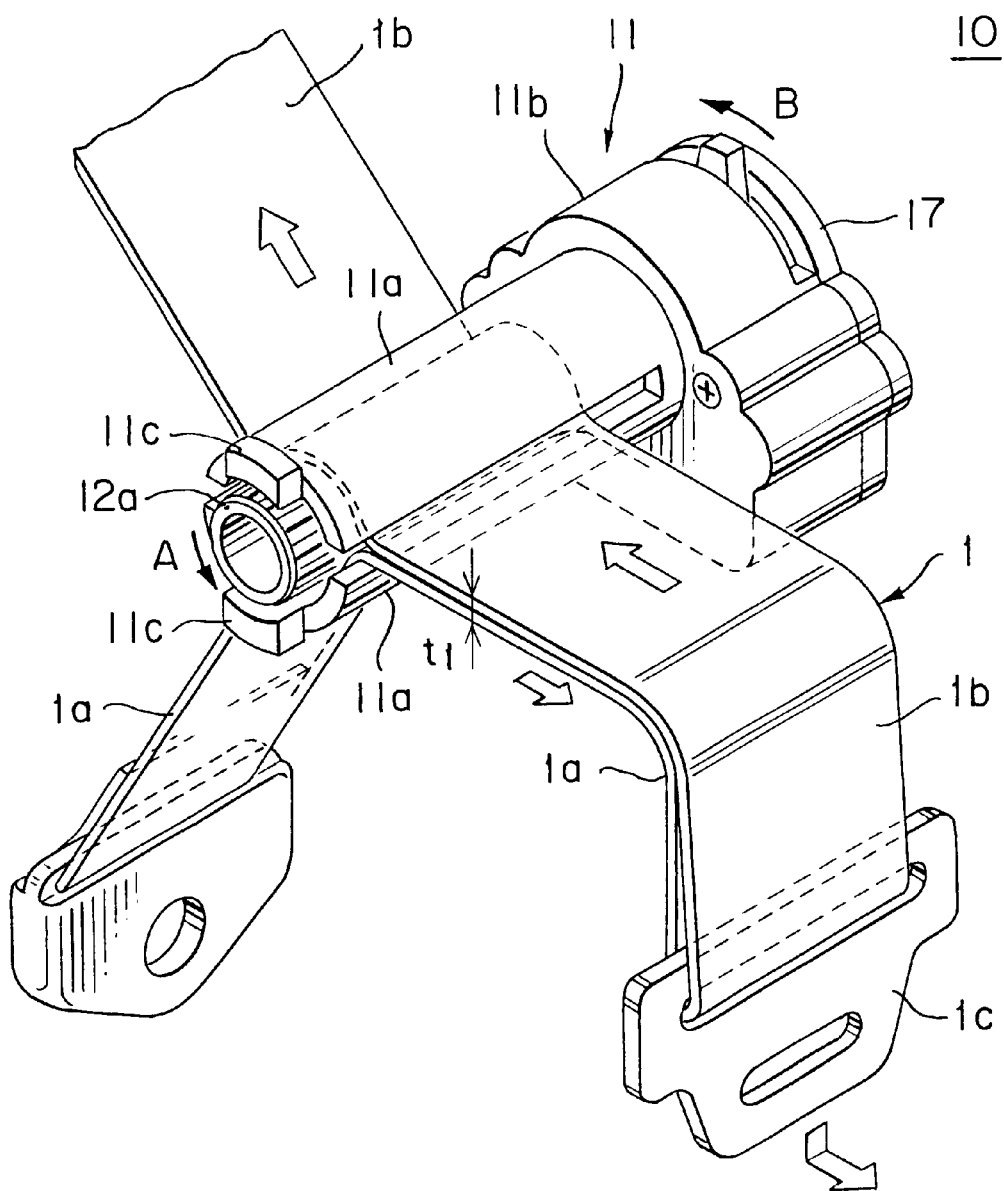
FIG. 3 is a perspective view of the locking clip of FIG. 1 in use.

As shown in FIG. 3, a shoulder belt section (an upper belt section) and a waist belt section (lower belt section) of the seat belt 1 are inserted in upper and lower portions of the annular space formed in the locking clip 10, respectively, and the cap 16 is put on the free ends of the semicylindrical parts 11a of the housing 11 to keep the shoulder belt section and the waist belt section in the locking clip 10.

The shaft 16a of the cap 16 is fitted in the cylindrical bore 12d of the clamping roller 12a, the cap 16 is pressed against the free ends of the semicylindrical parts 11a of the casing 11 and the cap 16 is turned to receive the flanges 11c of the casing 11 through the recesses 16c (FIG. 1) of the cap 16 in the cap 16. Then, the cap 16 is turned by a small angle. Consequently, the flanges 11c of the casing 11 are moved into spaces between the end wall of the cap 16 and inner flanges 16b formed on the open end of the cap 16. Thus, the cap 16 is fastened to the casing 11. The locking clip 10 is thus assembled.

Figure 4A:
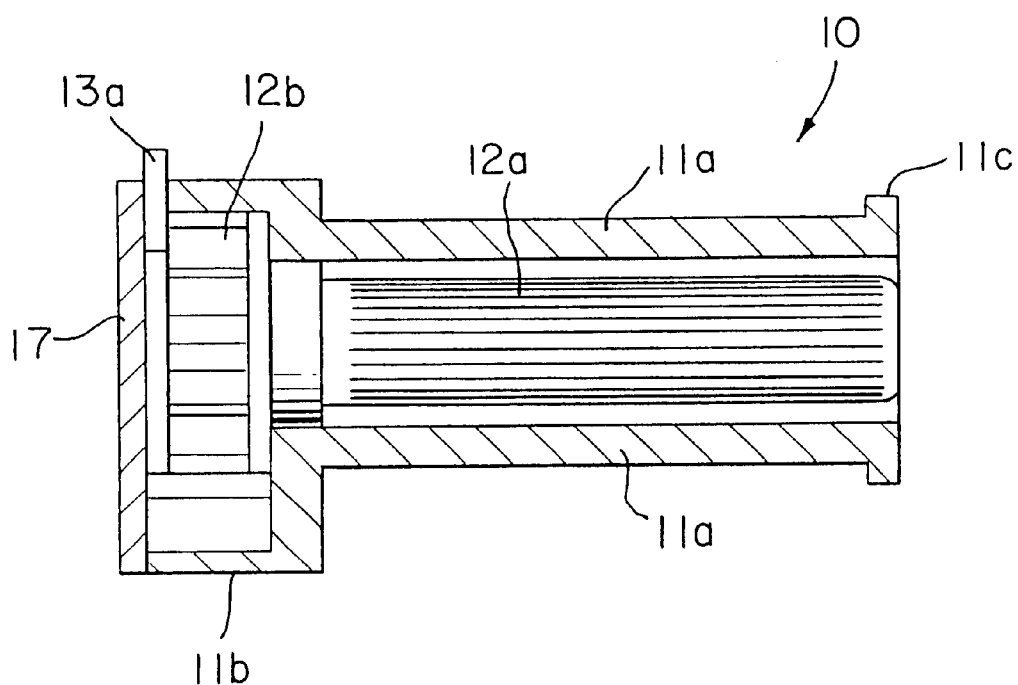
FIGS. 4A and 4B are an enlarged longitudinal sectional view and an enlarged ross-sectional view, respectively, of the locking clip of FIG. 1.
Figure 4B:
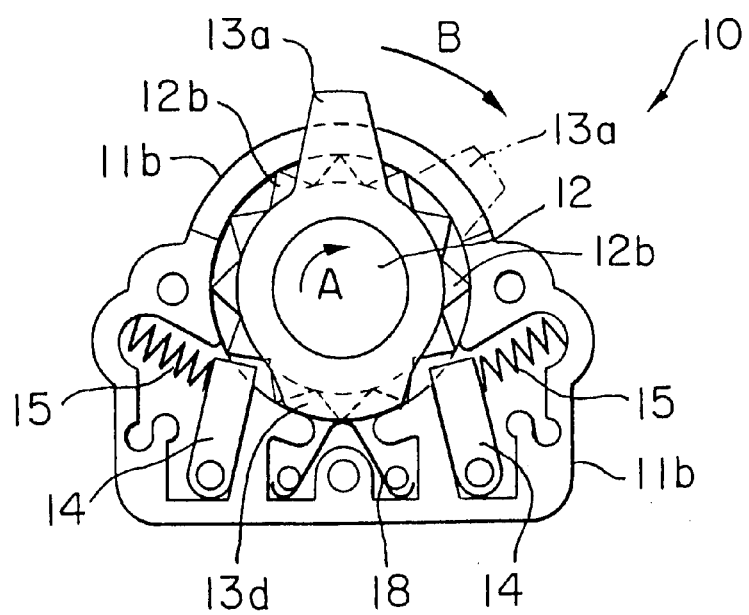

FIGS. 4A and 4B are a longitudinal sectional view and a cross-sectional view, respectively, of the locking clip 10. In FIG. 4B, the cover 17 is removed. Referring to FIG. 4B, when the selector lug 13a of the selector lever 13 is operated to turn the selector lever 13 from a neutral position, indicated by solid lines, in a direction of an arrow B (clockwise direction) to a first position indicated by two-dot chain lines, the operating part 13d of the selector lever 13 turns the second pawl 14 (left pawl) counterclockwise against the resilience of the compression coil spring 15 to disengage the second pawl from the ratchet wheel 12b. Consequently, the roller assembly 12 is allowed to rotate counterclockwise. In this state, the first pawl 14 (right pawl) is kept engaged with the ratchet wheel 12b by the compression coil spring 15, because the operating part 13d of the selector 15 lever 13 does not act on the first pawl 14.

Thus, the roller assembly 12 is restrained from clockwise rotation, as viewed in FIG. 4B, by the first pawl 14 (right pawl) being engaged with the ratchet wheel 12b and is allowed to rotate counterclockwise. When the ratchet wheel 12b is rotated counterclockwise, the first pawl 14 (right pawl) is turned clockwise on its pivots and is disengaged from the ratchet wheel 12b against the resilience of the compression coil spring 15 by the teeth of the ratchet wheel 12b.

The retaining spring 18 is in elastic contact with the operating part 13d of the selector lever 13. When the selector lug 13a is operated to turn the selector lever 13 to the first position, the retaining spring 18 comes into light contact with a first end, i.e. a right end as viewed in FIG. 4B, of the operating part 13d to retain the selector lever 13 at the first position. Consequently, the second compression coil spring 15 (left compression coil spring) is unable to turn the selector lever 13 counterclockwise and the selector lever 13 is retained at the first position, even if the selector lug 13a is released free.

When the selector lug 13a of the selector lever 13 is operated to turn the selector lever 13 counterclockwise from the neutral position to a second position, not shown, the operating part 13d of the selector lever 13 turns the first pawl 14 (right pawl) clockwise against the resilience of the compression coil spring 15 to disengage the first pawl 14 from the ratchet wheel 12b. Consequently, the roller assembly 12 is allowed to rotate clockwise. In this state, the second pawl 14 (left pawl) is kept engaged with the ratchet wheel 12b by the second compression coil spring 15 because the operating part 13d of the selector lever 13 does not act on the second pawl 14. Thus, the roller assembly 12 is restrained from counterclockwise rotation.

Thus, the roller assembly 12 is restrained from counterclockwise rotation, as viewed in FIG. 4B, by the second pawl 14 (left pawl) engaged with the ratchet wheel 12b and is allowed to rotate clockwise. When the ratchet wheel 12b is rotated clockwise, the second pawl 14 (left pawl) is turned counterclockwise on its pivots and is disengaged from the ratchet wheel 12b against the resilience of the second compression coil spring 15 by the teeth of the ratchet wheel 12b.

The selector lever 13 is turned to the first or the second position to enable the roller assembly 12 to rotate counterclockwise or clockwise.

The retaining spring 18, kept in elastic contact with the operating part 13d of the selector lever 13, comes into light contact with a second end, i.e. a left end as viewed in FIG. 4B, of the operating part 13d of the selector lever 13 when the selector lug 13a is operated to turn the selector lever 13 to the second position to retain the selector lever 13 at the second position. Consequently, the first compression coil spring 15 (right compression coil spring) is unable to turn the selector lever 13 clockwise and the selector lever 13 is retained at the second position, even if the selector lug 13a is released free.

A method of using the locking clip 10 provided with the ratchet mechanism will be described with reference to FIGS. 1 to 3.

Figure 10A:
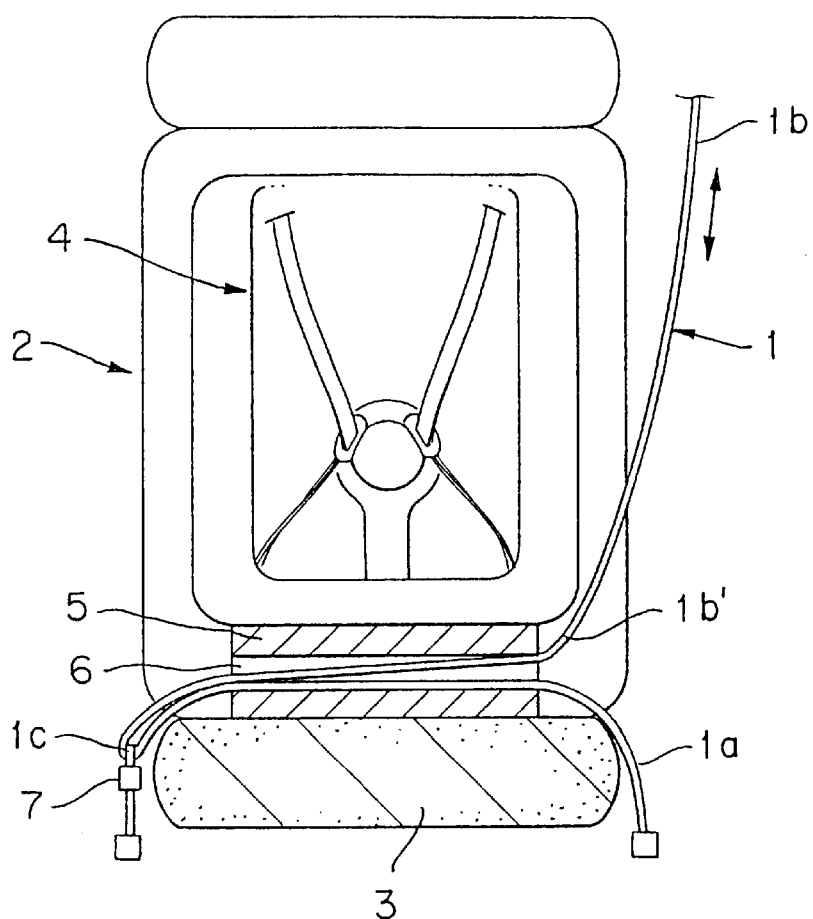
FIG. 10A is partial sectional front elevation of the seat of the vehicle and the child car seat mounted on and fastened with a seat belt to the seat.
Figure 10B:
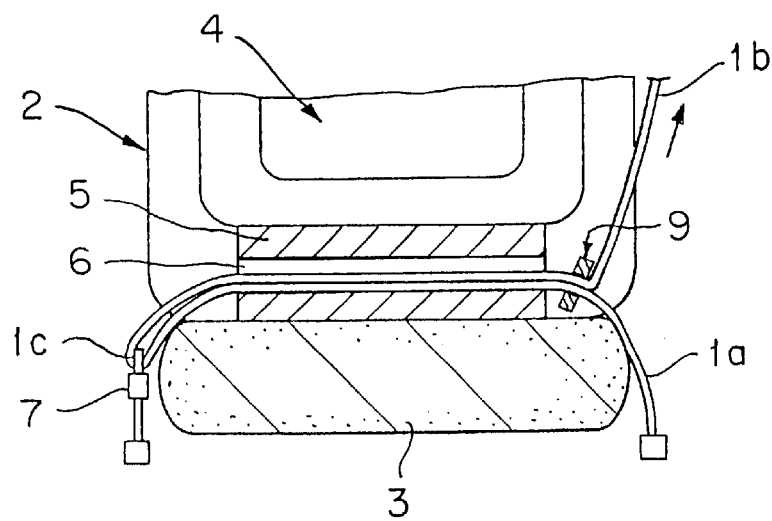
FIG. 10B is a partly sectional front elevation of the seat of the vehicle and the child car seat mounted on and fastened with a seat belt to the seat, in which the seat belt is tightened by a locking clip.

1) A child car seat is placed on a seat of a vehicle so as to face the front or the rear. A tongue connected to the seat belt 1 is passed from one side of the child car seat through a belt slot formed in one of the side walls of the base of the child car seat and is pulled out through a belt slot formed in the other side wall of the base on the other side of the child car seat. The tongue is engaged with a buckle disposed beside the seat of the vehicle to fasten the child car seat tentatively to the seat of the vehicle (FIG. 10A).

2) Then, the cap 16 is turned to an angular position where the recesses 16c formed in the inner flange formed at the open end of the cap 16 coincide with the flanges 11c of the semicylindrical parts 11a, and the cap 16 is separated from the semicylindrical parts 11a of the casing 11 as shown in FIG. 1.

3) Respective portions of the waist belt section 1a and the shoulder belt section 1b in the vicinity of the belt slot are pulled together. Then, the waist belt section 1a is inserted in the space between the clamping roller 12a and the upper semicylindrical part 11a, and the shoulder belt section 1b is inserted in the space between the clamping roller 12a and the lower semicylindrical part 11a, as shown in FIG. 3.

4) The operations carried out to separate the cap 16 from the sericylindrical parts 11a are reversed to join the cap 16 to the semicylindrical parts 11a to complete work for attaching the locking clip 10 to the seat belt 1.

5) If the child car seat is not firmly fastened to the seat of the vehicle after the locking clip 10 has been thus attached to the seat belt 1, the selector lever 13 of the ratchet mechanism is turned to the first position or the second position, and the shoulder belt section 1b of the seat belt 1 is pulled in the direction of the blank arrows (FIG. 3). Consequently, the seat belt is further tightened and the waist belt section 1a holding down the child car seat cannot be loosened, even if the waist belt section 1a is pulled in a direction opposite the direction of the blank arrow because the clamping roller 12a of the locking clip 10 is able to rotate in only a single direction.

FIG. 3 shows the locking clip 10 used in combination with the seat belt 1 for the right seat of the vehicle. When the locking clip 10 is used in combination with the seat belt 1 for the left seat of the vehicle, the locking clip 10 is put on the seat belt 1 in a direction opposite the direction in which the locking clip 10 is put on the seat belt 1 in FIG. 3. As a result, the selector lever 13 of the ratchet mechanism is turned in the opposite direction to set the selector lever 13.

Thus, the portions of the waist belt section 1a and the shoulder belt section 1b of the seat belt 1 in the vicinity of the belt slot are clamped together by the locking clip 10. The waist belt section 1a holding down the child car seat can be further tightened simply by pulling the shoulder belt section 1b and the waist belt section 1a is prevented from loosening by the locking clip 10.

Figure 5:
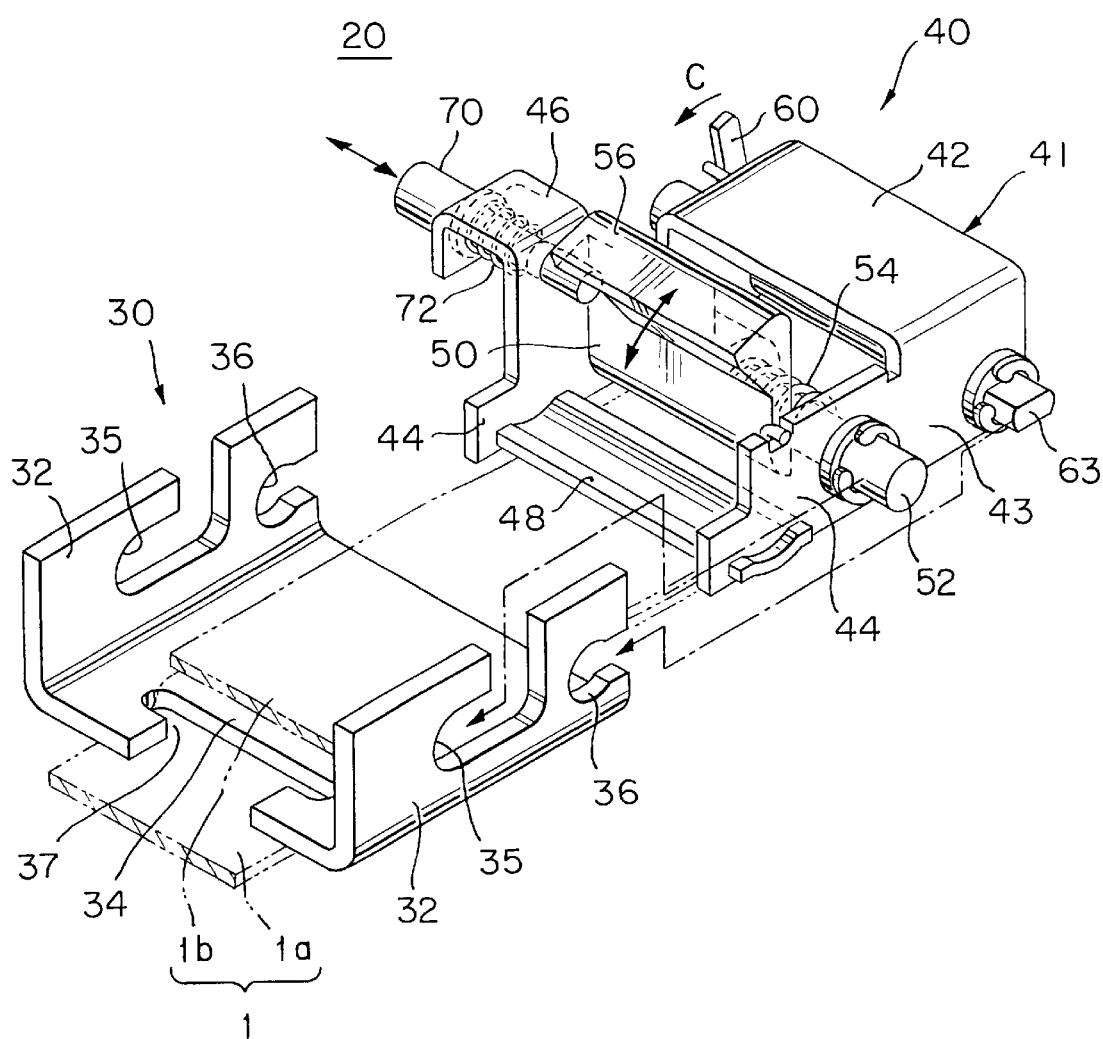
FIG. 5 is an exploded perspective view of a locking clip in a second embodiment of the present invention.
Figure 6:
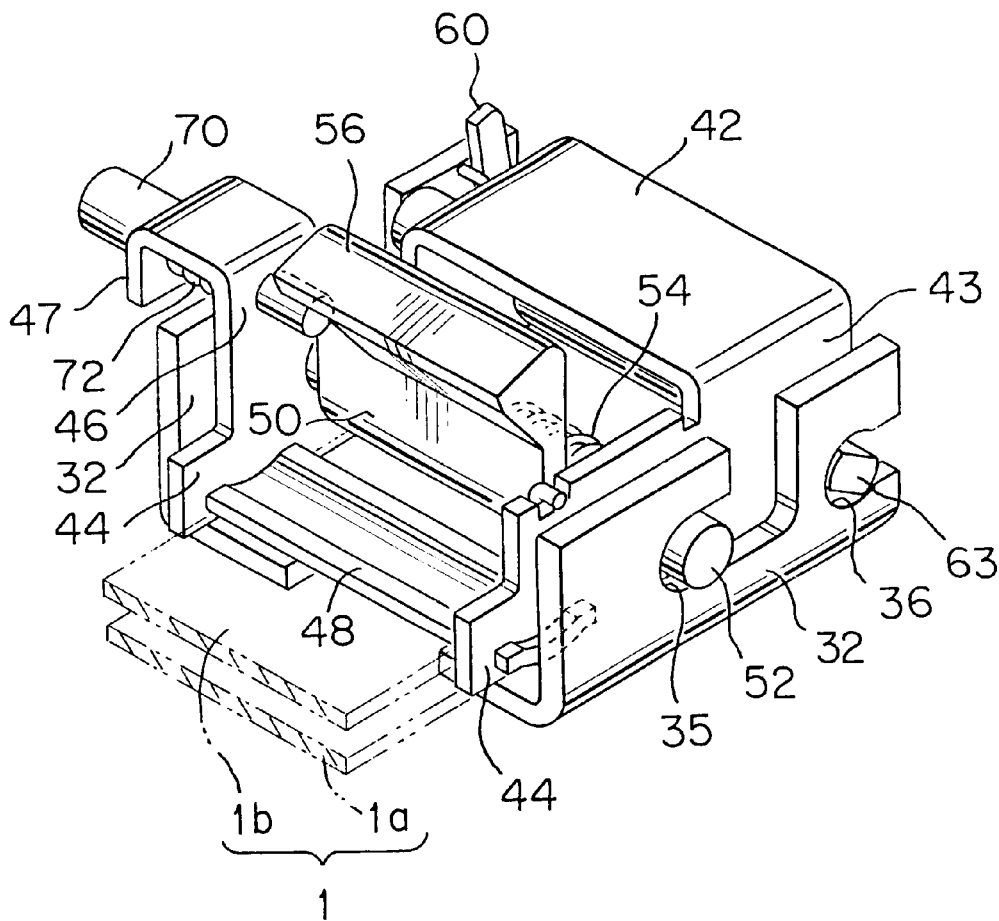
FIG. 6 is a perspective view of the locking clip of FIG. 5 as assembled.
Figure 9:
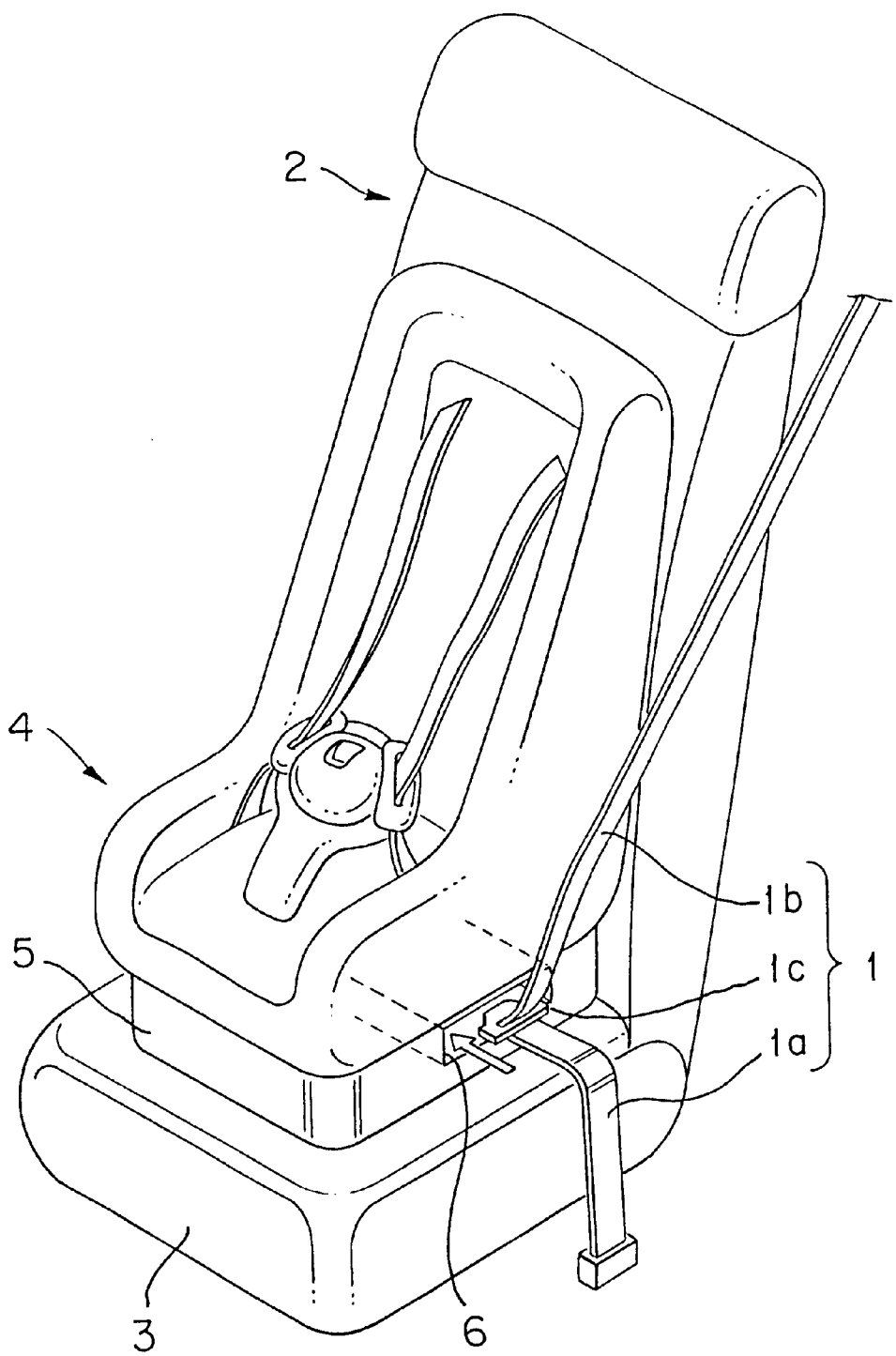
FIG. 9 is a perspective view of a child car seat as mounted on a seat of a vehicle.

FIGS. 5 to 7 show a locking clip 20 in a second embodiment of the present invention. Referring to FIG. 5, the locking clip 20 can be divided into two parts, i.e. a base and a belt pressing unit 40 mounted on the base 30.

The base 30 is a member having a U-shaped cross section formed by bending a comparatively thick, substantially rectangular plate. The base 30 has a bottom wall 34 and side walls 32. Each side wall 32 is provided with an L-shaped slot 35 opening in the upper edge of the side wall 32, and a keyhole-shaped slot 36 opening in the rear end edge (right end edge as viewed in FIG. 5) of the side wall 32. The slot 36 has a narrow, straight section and around end section. The bottom wall 34 is provided in a front portion thereof (left end portion as viewed in FIG. 5) with a T-shaped belt slot 37 opening in the front edge thereof The bottom wall 34 may be provided with a belt groove similar to the belt slot 37 in a rear portion thereof This is effective in keeping a seat belt 1 tight particularly when a collision occurs to the bottom wall 34 provided with belt slots 37 in the opposite end portions thereof.

Opposite end portions of a support shaft 52 of the belt pressing unit 40 engage in the L-shaped slots 35, respectively. Opposite flat end portions 63 of a support shaft 62 supporting a guide roller 64 are inserted in the narrow straight sections of the slots 36 with their flat surfaces extended in parallel to the narrow straight sections, and the support shaft 62 is turned after the flat end portions 63 have reached the round end sections so that the flat end portions 63 are retained in the round sections of the slots 36.

As shown in FIG. 5, the belt pressing unit 40 of the locking clip 20 has a support member 41 (pressing member) formed by processing a steel plate, a toothed cam shaft 50 extended between the opposite side walls of the support member 41, a guide roller 64 extended between the opposite side walls of the support member 41, and a locking pin 70 projecting from the support member 41.

The base 30 and the support member 41 of the belt pressing unit 40 constitute a belt clamping mechanism. The toothed cam shaft 50, the locking pin 70 and the guide roller 64 constitute a ratchet mechanism.

The support member 41 has, in an integral structure, a U-shaped part 42 (FIG. 7B) opening downward and having side portions 43, side parts 44 extending from the side portions 43 of the U-shaped part 42, and an upright part 46 extending upward from one of the side parts 44 and having a U-shaped portion 47 (FIGS. 6 and 7B) formed by bending an upper end portion thereof Further, a member 48 connects the side parts 44.

The toothed cam shaft 50 and the guide roller 64 are extended between and supported on the side parts 44 of the support member 41. The toothed cam shaft 50 is supported for rotation on the support shaft 52. As shown in FIG. 7A, the toothed cam shaft 50 is provided with teeth 58 in a region of its lower surface extending from a lowermost portion of the lower surface in a direction in which the seat belt 1 is pulled for tightening. The toothed cam shaft 50 has an arm 56 projecting upward from a portion thereof In a state where the belt pressing unit 40 is combined with the base 30, a gap of a thickness twice the thickness of the seat belt 1 is formed between the teeth 58 of the toothed cam shaft 50 and the bottom wall 34 of the base 30. When the waist belt section 1a and the shoulder belt section 1b of the seat belt 1 are superposed in the gap between the teeth 58 and the bottom wall 34, some of the teeth 58 are in light contact with the shoulder belt section 1b in a light contact state. When the shoulder belt section 1b is pulled in the direction of the arrow F toward a retractor in the light contact state, the toothed cam shaft 50 is urged to turn counterclockwise, indicated by the arrow A in FIG. 7A, because the teeth 58 are in light contact with the shoulder belt section 1b. Consequently, the teeth 58 are moved away from the shoulder belt section 1b and do not bite into the shoulder belt section 1b, so that the shoulder belt section 1b can be pulled in the direction of the arrow F. If the shoulder belt section 1b is pulled in the direction of the arrow G in FIG. 7A, the toothed cam shaft 50 is urged to turn clockwise, i.e., in a direction opposite the direction of the arrow A, because the teeth 58 are in light contact with the shoulder belt section 1b. Consequently, the teeth 58 bite into the shoulder belt section 1b and hence the shoulder belt section 1b cannot be pulled. Thus, the function of a ratchet mechanism is exercised.

When it is desired to enable the shoulder belt section 1b to be pulled in either direction by nullifying the function of the ratchet mechanism, the locking pin 70 is operated. The locking pin 70 is supported at two points thereon on the U-shaped portion 47 of the upright part 46 extending upward from one of the side parts 44 of the belt pressing unit 40 so as to be advanced into and retracted from a turning region of the arm 56 of the toothed cam shaft 50. A stop ring 73 (FIG. 7B) is attached to the locking pin 70 and a compression coil spring 72 is compressed between an end section of the U-shaped portion 47 and the stop ring 73 to bias the locking pin 70 toward the turning region of the arm 56.

The function of the ratchet mechanism can be nullified by the following procedure.

(1) The locking pin 70 is pulled against the resilience of the compression coil spring 72 to retract the locking pin 70 from the turning region of the arm 56.

(2) The arm 56 is turned counterclockwise, as viewed in FIG. 7A.

(3) The locking pin 70 is released after turning the arm 56 in a counterclockwise direction beyond a position corresponding to the locking pin 70.

(4) The locking pin 70 advances into the turning region of the arm 56.

(5) The clockwise turning of the arm 56 is prevented by the locking pin 70 and hence, the arm 56 is unable to return to its original position even if the same is released. In this state, the teeth 58 of the toothed cam shaft 50 are moved upward away from the bottom wall 34 and hence, the teeth 58 are unable to bite into the shoulder belt section 1b when the shoulder belt section 1b is pulled in either direction. Thus, the function of the ratchet mechanism is nullified.

The toothed cam shaft 50 is always biased clockwise, as viewed in FIG. 7A, by a return spring 54 locate the teeth 58 near the base 30.

The free guide roller 64 disposed in parallel to the toothed cam shaft 50 at a predetermined distance in a direction in which the shoulder belt section 1b is pulled from the toothed cam shaft 50. The shoulder belt section 1b is wound around the guide roller 64 so that the same can be smoothly pulled in the direction of the arrow F without touching any part of the locking clip 20 for tightening. Since the guide roller 64 guides the seat belt 1 for movement along the bottom wall 34, useless contact between the seat belt 1 and the teeth 58 and the abrasion of the seat belt 1 can be avoided.

The guide roller 64 is supported for rotation on the support shaft 62 having the opposite flat end portions and is biased in a predetermined direction by a return spring 66. A turning lever 60 is connected to the support shaft 62 to turn the support shaft 62.

A method of using the locking clip 20 provided with the ratchet mechanism will be described.

1) A child car seat is placed on a seat of a vehicle so as to face the front or the rear. A tongue connected to the seat belt 1 is passed from one side of the child car seat through a belt slot formed in one of the side walls of the base of the child car seat and is pulled out through a belt slot formed in the other side wall of the base on the other side of the child car seat. The tongue is engaged with a buckle disposed beside the seat of the vehicle to fasten the child car seat tentatively to the seat of the vehicle (FIG. 10A).

2) Then, the turning lever 60 is turned against the resilience of the return spring 66 to set the flats of the opposite end portions of the support shaft 62 horizontally. The opposite end portions of the support shaft 62 are pulled out of the keyhole-shaped slots 36 and opposite end portions of the support shaft 52 supporting the toothed cam shaft 50 are pulled out of the L-shaped slots 35 of the base 30 to separate the belt pressing unit 40 from the base 30, as shown in FIG. 5.

3) The waist belt section 1a is passed through the T-shaped belt slot 37 of the bottom wall 34 of the base 30, the shoulder belt section 1b is extended on the bottom wall 34, and the base 30 and the belt pressing unit 40 are assembled. The operations for separating the base 30 from the belt pressing unit 40 are reversed to assemble the base 30 and the belt pressing unit 40. That is, the lever 60 is turned in the direction of the arrow C, as viewed in FIG. 5, to set the flats of the opposite end portions 63 of the support shaft 62 horizontally. The opposite end portions 63 of the support shaft 62 are inserted in the keyhole-shaped slots 36 formed in the side walls 32. The lever 60 is turned in a direction opposite the direction of the arrow C after the flat end portions 63 have reached the round end sections of the keyhole-shaped slots 36 so that the flat end portions 63 are retained in the round sections of the slots 36. At the same time, the opposite end portions of the support shaft 52 supporting the toothed cam shaft 50 are inserted in the L-shaped slots 35 of the base 30. Thus, the toothed cam shaft 50 and the guide roller 64 of the belt pressing unit 40 are disposed with a gap of the predetermined thickness formed between the bottom wall 34 of the base 30, and the toothed cam shaft 50 and the guide roller 64.

4) FIGS. 7A and 7B show the assembly of the base 30 and the belt pressing unit 40. The seat belt 1 can be tightened by pulling the shoulder belt section 1b toward the retractor.

To ensure that the seat belt 1 is maintained in the tight state, a locking clip in a modification of the second embodiment is provided with a toothed cam shaft 50 having a thick arm 56 provided with two grooves of different depths, as shown in FIGS. 8A(i) and (ii) and 8B(i) and (ii). FIGS. 8A(i) and (ii) show the positional relation between the arm 56 and the locking pin 70. FIG. 8A(ii) is a sectional view taken on line A—A in FIG. 8A(i). FIGS. 8B(i) and (ii) are sectional views showing two possible positions of the locking pin 70 in the toothed cam shaft 50.

As shown in FIG. 8A(ii), the arm 56 is provided in the inner surface of a thick portion thereof with a deep, narrow groove 81 and a shallow, wide groove 82. As shown in FIGS. 8B(i) and (ii), the locking pin 70, supported on the U-shaped portion 47 of the upright part 46, can be placed at a first position shown in FIG. 8B(i) and a second position shown in FIG. 8B (ii). When the locking pin 70 is at the first position shown in FIG. 8B(i), the arm 56 is able to turn counterclockwise in a wide angular range L1. Since the arm 56 is able to turn counterclockwise until an inner surface 84 of the shallow, wide groove 82 comes into contact with the locking pin 70 when the shoulder belt section 1b is pulled toward the retractor, the teeth 58 of the toothed cam shaft 50 are moved away from the bottom wall 34, as shown in FIG. 7A, and do not bite into the shoulder belt section 1b, so that the seat belt 1 can be tightened.

When the locking pin 70 is at the second position in the deep, narrow groove 81 as shown in FIG. 8B (ii), the toothed cam shaft 50 is turned so that the teeth 58 shown in FIG. 7A are located nearest to the bottom wall 34 and the teeth 58 are deeply engaged with the shoulder belt section 1b. Since the arm 56 cannot be turned any further in a counterclockwise direction due to a narrow angular range L2, the seat belt 1 cannot be further tightened.

Thus, the seat belt 1 can be maintained in a tight state with reliability by turning the arm 56 counterclockwise, as viewed in FIG. 8A(i), and pushing the locking pin 70 into the deep, narrow groove 81 as shown in FIG. 8B(ii) after pulling the shoulder belt section 1b toward the retractor.

Although the present invention has been described in terms of the two preferred embodiments thereof, the present invention is not limited thereto in its practical application and changes and improvements may be made therein.

For example, the semicylindrical parts 11a covering the clamping roller 12a and serving as a shoulder belt section holding plate of the locking clip 10 in the first embodiment are immovable relative to the clamping roller 12a. The casing 11 maybe provided with hinged holding plates capable of being turned on hinges relative to the clamping roller 12a, instead of the fixed semicylindrical parts 11a. When the hinged holding plates are turned away from the clamping roller 12a to expose the clamping roller 12a, the locking clip 10 can be easily attached to the seat belt by a simple operation.

The base 30 and the support member 41 of the belt pressing unit 40 of the locking clip 20 in the second embodiment are separate members. The connection of the base 30 and the support member 41 by a hinge will facilitate handling the locking clip 20 and will prevent loosening of the base 30 and the support member 41. The locking clip 20 can be easily attached to the seat belt when the same is opened, by turning the base 30 and the belt pressing unit 40 on the hinge.

Although the invention has been described in its preferred embodiments with a certain degree of particularity, obviously many changes and variations are possible therein. It is therefore to be understood that the present invention may be 20 practiced otherwise than as specifically described herein without departing from the scope and spirit thereof.

What is claimed is:

1. A locking clip to be attached to a portion of a seat belt having a waist belt section and a shoulder belt section to allow the seat belt to be securely fastened to a child car seat, said locking clip comprising:

a belt clamping mechanism being operable to clamp the waist belt section and the shoulder belt section, said belt clamping mechanism comprising:
a base; and
a pressing member extending parallel to said base, said pressing member being operable to clamp the waist belt section and the shoulder belt section between said base and said pressing member; and a rachet mechanism being operable to permit the shoulder belt section clamped by said belt clamping mechanism to be moved in only one direction, said rachet mechanism comprising:

a toothed cam shaft having teeth in a lowermost portion of said toothed cam shaft and an arm projecting from an uppermost portion of said toothed cam shaft, said arm having two grooves of differing width, said toothed cam shaft being rotatably supported on said pressing member, wherein said toothed cam shaft is biased toward said base so that said teeth of said toothed cam shaft engage with the shoulder belt section clamped between said base and said pressing member to permit the shoulder belt section to move in only one direction; and a locking member supported on said pressing member so as to be advanced into and retracted from a turning region when said arm of said toothed cam shaft is turned, wherein said locking member is moveably inserted into one of the two grooves of said arm, such that said toothed cam shaft is turnable when said locking member is inserted into a wider groove of the two grooves and said toothed cam shaft is unable to turn when said locking member is inserted in a narrower groove of the two grooves.

2. A locking clip according to claim 1, wherein said ratchet mechanism further comprises a guide roller spaced a predetermined distance in a direction in which the seat belt is moved from said toothed cam shaft to guide at least the shoulder belt section in a moving direction of the shoulder belt section.

3. A locking clip according to claim 1, wherein the two grooves differ from each other in depth and width, and the two grooves are disposed in an overlapping relation with each other so that a deeper narrower groove is included in a shallower wider groove.

4. A locking clip according to claim 1, wherein said locking member is biased toward the turning region of said arm of said toothed cam shaft.

* * * * *